US007019210B2

(12) United States Patent
Radin et al.

(10) Patent No.: US 7,019,210 B2
(45) Date of Patent: Mar. 28, 2006

(54) CABLE SUSPENSION ARRANGEMENT FOR LUMINAIRES

(75) Inventors: Bernd Radin, Warstein (DE); Matthias Eickel, Arnsberg (DE)

(73) Assignee: Trilux-Lenze GmbH & Co. KG, Arnsberg (DE)

( * ) Notice: Subject to any disclaimer, the term of this patent is extended or adjusted under 35 U.S.C. 154(b) by 0 days.

(21) Appl. No.: 10/847,894

(22) Filed: May 18, 2004

(65) Prior Publication Data

US 2005/0051673 A1 Mar. 10, 2005

(30) Foreign Application Priority Data

May 19, 2003 (DE) .......................... 203 07 903 U

(51) Int. Cl.
*H02G 3/08* (2006.01)

(52) U.S. Cl. ........................... 174/50; 174/60; 174/58; 174/63; 361/600

(58) Field of Classification Search .................. 174/50, 174/60, 58, 17 R, 63, 53, 135; 220/4.02, 220/3.8; 248/906; 439/535; 361/600
See application file for complete search history.

(56) References Cited

U.S. PATENT DOCUMENTS

| | | | | |
|---|---|---|---|---|
| 2,465,857 | A * | 3/1949 | Erling | 248/61 |
| 5,845,037 | A | 12/1998 | Miekis | 385/136 |
| 6,518,500 | B1 * | 2/2003 | Huang | 174/50 |
| 6,653,560 | B1 * | 11/2003 | Wu | 174/50 |
| 6,870,100 | B1 * | 3/2005 | Corwin | 174/58 |

FOREIGN PATENT DOCUMENTS

| | | |
|---|---|---|
| DE | 18 28 179 | 3/1961 |
| DE | 78 38 482 | 7/1979 |
| DE | 86 22 319 | 12/1986 |
| DE | 40 104 16 | 10/1990 |

* cited by examiner

*Primary Examiner*—Dhiru R. Patel
(74) *Attorney, Agent, or Firm*—Grossman Tucker Perreault & Pfleger, PLLC

(57) ABSTRACT

The invention concerns a cable suspension arrangement for hanging luminaries including a holder for a cable which is vertical in the position of installation for suspending a luminaire at a cable holder point and a fixing region for fixing the luminaire to the suspension arrangement, wherein the fixing region has a center, wherein there is provided a mechanism for displacement of the cable holder point laterally with respect to the longitudinal direction in which the cable extends, relative to the center of the fixing region for the luminaire, or for displacement of the center of gravity of the luminaire, laterally with respect to the longitudinal extent of an associated luminaire, relative to the cable holder point of the luminaire housing. The invention is distinguished in that the lateral displacement mechanism includes an eccentric element, the rotation of which causes lateral displacement of the cable holder point and the center of the light fixing region relative to each other or of the cable holder point and the center of gravity of an associated luminaire housing relative to each other.

13 Claims, 4 Drawing Sheets

SECTION A - A

SECTION B - B

SECTION C - C

CABLE SUSPENSION ARRANGEMENT FOR LUMINAIRES

FIELD OF THE INVENTION

The invention concerns a cable suspension arrangement for hanging luminaires comprising a holder for a cable which is vertical in the position of installation for suspending a luminaire at a cable holder point and a fixing region for fixing the luminaire to the suspension arrangement, wherein the fixing region has a center, wherein there are provided means for displacement of the cable holder point laterally with respect to the longitudinal direction in which the cable extends, relative to the center of the fixing region for the luminaire, or means for displacement of the center of gravity of the luminaire, laterally with respect to the longitudinal extent of an associated luminaire, relative to the cable holder point of the luminaire housing.

The invention further concerns a luminaire having a cable suspension arrangement.

BACKGROUND OF THE INVENTION

In order to hang up luminaires in many cases the luminaire housing is suspended by way of two or four cables from a ceiling or another horizontal carrier, the cables engaging the body of the luminaire in mutually spaced relationship. The associated cable holder points are mostly arranged in the region of the ends of the luminaire housing so that they are at the greatest possible spacing from each other. In that case the cable holder point is the substantially punctiform region of the cable at which the load of the luminaire housing is transmitted to the cable, that is to say the point at which the luminaire housing including the cable suspension arrangement engage the respective cable for transmission of the load involved. The cable suspension arrangement itself in that case is connected to the luminaire with an associated fixing region having a center which is defined by virtue of the fact that, in the case of a symmetrical, that is to say ideal, distribution of weight on both sides of the housing which are defined by the connecting line of the cable holder points of the luminaire, the center of gravity of the luminaire is on the connecting line of the cable holder points and therefore the luminaire is suspended exactly horizontally. The center of the fixing region of the suspension arrangement is thus arranged in the central plane of the housing.

The term cable suspension arrangement of that kind, in accordance with the invention, is used to denote cable suspension arrangements which are generally suspended by a strand-shaped elongate suspension element, this term also being used in accordance with the invention to denote wires or the like. In addition, the cable can be of differing diameters in different transverse directions relative to the direction of the longitudinal extent thereof and can be for example in the manner of a band, in which case then the holder point is on the longitudinal center line of the band.

Suspension arrangements of that kind for hanging luminaires sometimes give rise to the problem that different distributions of weight on both sides of the luminaire cause the suspended luminaire to adopt an inclined position, which is unwanted. Asymmetrical distributions of weight of that kind may occur for example due to tolerances in the respective material thicknesses of the individual components, due to asymmetrical installation parts and/or due to assembly tolerances. Problems of that kind occur in particular in the case of dual-wing luminaires in which light means are arranged on both sides of a device carrier provided with cable suspension arrangements, so that luminaires of that kind are of a comparatively great width.

Such inclined positioning of the luminaire bodies can be avoided by balancing weights to be fixed separately to the luminaire, but determining the reference positions and the required weights for the balancing weights in order to provide that the luminaire is arranged horizontally is a comparatively laborious procedure.

SUMMARY OF THE INVENTION

Therefore the object of the present invention is to provide a luminaire or an arrangement of a luminaire, by means of which the luminaire can be easily oriented horizontally even in the case of an asymmetrical weight distribution causing the hanging luminaire to adopt an inclined position, wherein the device can be easily integrated in the luminaire and can be easily manufactured.

That object is attained in that the lateral displacement means includes an eccentric element, the rotation of which causes lateral displacement of the cable holder point and the center of the luminaire fixing region relative to each other or of the cable holder point and the center of gravity of an associated luminaire housing relative to each other.

In addition the object of the invention is attained by a luminaire housing.

By virtue of the lateral displacement of the cable holder point relative to the fixing region of the luminaire it is possible to compensate for irregular weight distributions of the luminaire so that the center of gravity of the luminaire again coincides with the connecting line of the cable holder points which are spaced in the longitudinal direction of the luminaire. The fact that weight equalization is effected by the configuration of the cable suspension arrangement according to the invention means that there is no need to arrange further luminaire accessory components such as balancing weights or the like as only the luminaire housing overall can be displaced laterally with respect to the cable suspension arrangement, which is particularly preferred. The displacement is thus accordingly effected at least with a component transversely with respect to the longitudinal direction of the luminaire, in which respect the displacement can be effected linearly, preferably perpendicularly to the longitudinal direction of the luminaire, or with another, for example curved, path of displacement.

It is however also possible, optionally independently of the cable suspension arrangement, to provide means for displacement, with respect to the longitudinal extent of the luminaire, of the center of gravity of the luminaire in a transverse direction relative to the cable holder point of the luminaire. Those means are preferably arranged, with respect to the longitudinal direction of the luminaire, at least at approximately or precisely at the level of the cable suspension arrangement, without that always being absolutely necessary. For adjustment of the horizontal position of the luminaire it is possible to provide for example displaceable balancing weights which are integrated into the housing, and components which are already present, in particular those of comparatively high weights such as transformers, housing components or the like, can also be transversely displaceable with respect to the transverse direction of the housing. Advantageously however the housing overall is displaceable in the transverse direction with respect to the cable suspension means, for example by virtue of a suitable design configuration of the luminaire suspension arrangement itself, as the high overall weight of the housing means that only comparatively short displacement distances are necessary to provide the balancing effect.

In that respect, for most situations of use, lateral displacement of the fixing region of the cable suspension arrangement relative to the cable holder point of between about 0.5 and about 5 mm, preferably in the range of between 1 and 3 mm, has proven to be adequate.

The lateral displacement means can act on an associated luminaire housing, with lateral displacement thereof relative to the longitudinal direction of the housing which is defined by the connecting line of spaced cable holder points. The displacement means can thus act on the luminaire housing directly or possibly also with the interposition of a transmission mechanism. In that way the displacement means can be of a particularly simple and robust structure and can thus also be used for hanging luminaires of comparatively weight.

Preferably the cable holder is in the form of a cable ducting means which extends through the lateral displacement means. The cable ducting means can be closed on all sides. As a result, the cable suspension arrangement can be of a particularly compact structure.

In particular the cable holder can be arranged at the center of the suspension arrangement or on the longitudinal axis thereof, which extends parallel to the longitudinal direction in which the cable extends, wherein the lateral displacement means can be such that the cable holder point is invariable in position by actuation of the displacement means in a direction perpendicular to the longitudinal direction of the luminaire. A balancing effect is thus not afforded by way of a change in position of the cable holder point. For that purpose for example the cable holder point can be arranged at the level of the rotary axis upon actuation of the displacement means by a rotary movement.

Alternatively or supplemental thereto the lateral displacement means can act on the cable holder or can directly engage the cable holder so that, with lateral displacement of the cable holder relative to the longitudinal axis of the housing or a central plane of the housing, the associated luminaire housing can be oriented substantially or exactly horizontally. In that case the longitudinal axis of the housing is defined by the connecting line joining the cable suspension points.

Preferably a lateral displacement means according to the invention is associated with each cable suspension means of the luminaire.

Particularly simple access to the lateral displacement means is afforded if an actuating member for lateral displacement of the light fixing region and the cable holder relative to each other or generally of the center of gravity of the cable suspension is arranged at the end of the cable suspension arrangement, which is the upper end in the position of installation. The displacement means is thereby easily accessible, irrespective of the side of the luminaire from which the respective operator actuates the displacement means. For that purpose the actuating member may have an engagement region for a tool which is arranged at the end of the cable suspension arrangement, which is the upper end in the position of installation. The actuating member however may possibly also be arranged laterally on the housing of the luminaire.

The actuating member may be such that the position of the lateral displacement means and therewith at least qualitatively the displacement of the cable suspension and the luminaire fixing region relative to each other can be read off at the actuating member. For that purpose for example in the case of a displacement means in the form of an eccentric which is further described hereinafter, the actuating member may have a marking which can also be in the form of an engagement region for a tool such as for example in the form of a slot, in which respect the marking can indicate the eccentric axis, for example by the slot-form marking extending in parallel relationship with the eccentric axis.

In accordance with a particularly preferred embodiment the lateral displacement means includes an eccentric element, wherein lateral displacement of the cable suspension point relative to the center of the luminaire fixing region is implemented by rotation of the eccentric element. In that case the plane of the eccentric is preferably perpendicular to the longitudinal direction in which the cable extends. The eccentric element provides that it is possible to produce high levels of torque and/or forces for displacement of the luminaire relative to the cable suspension configuration, with the cable suspension arrangement being of a compact structure. Preferably the displacement means only consists of an eccentric element acting directly on the housing and an actuating member acting directly on the eccentric element, which element and member can be integrally connected together or can be of a multi-part nature. In that case the eccentric element can be actuated by direct actuation of the component provided with the eccentric, or the eccentric element can also be actuated by a control member. Optionally, a force transmission means such as for example in the form of a linkage or the like can also be provided between the eccentric element and the cable holder or the region of the luminaire housing on which the eccentric element acts.

A cable suspension arrangement which can be particularly easily fixed to the luminaire housing is afforded if, in the position of installation, it includes an upper and a lower suspension member which can be fixed to each other, wherein at least the lower suspension member has a cable holder and a fixing region for the luminaire housing. In that way the cable suspension arrangement can be particularly easily secured to a fixing region of the housing which for example is in the form of a through opening which partially or completely surrounds the cable suspension arrangement. The fixing of the upper and lower suspension members can be effected releasably or permanently or non-releasably. In particular the fixing can be effected by a screw connection, with the longitudinal axis of the screw extending in parallel relationship with the axis of rotation of the eccentric. In that case the eccentric can be provided with a bore having a female screwthread. For non-loosably fixing the upper and lower suspension members, a screw securing means or another suitable securing element can be provided so that the upper and the lower suspension members are always moved synchronously with each other. Optionally the contact region of the cable suspension arrangement for the luminaire housing, to which optionally predominantly only a holding or support function can be attributed, can also be variable in position, for example rotatable, with respect to the eccentric element. In that respect the cable holder can be in the form of a cable ducting means which is closed partially or on all sides.

For the purposes of fixing the luminaire housing, a lateral cross-sectional constriction such a laterally open groove can be arranged in the connecting region of the upper and lower suspension members, for receiving a fixing region of the luminaire housing, wherein the groove can be in the form of a peripheral groove. Preferably the lateral displacement means which in particular can be in the form of an eccentric element is arranged on the upper suspension member or engages it, so that the component provided with the eccentric element can be actuated directly itself under the effect of the lateral displacement. Optionally however the displacement means may also engage the lower suspension member.

In addition preferably the lower suspension member has a fixing region which engages into the upper suspension member, in particular in the form of a screwthreaded pin, wherein provided on the lower suspension member preferably in concentric relationship with the screwthreaded pin is a cable holder, for example in the form of a blind bore which extends in the longitudinal direction of the pin so that a cable end provided with a clamp or the like can be arranged in the recess and the cable can be passed through the screwthreaded pin.

In accordance with an alternative embodiment the lateral displacement means can include a setting means or can be in the form of a setting means which is displaceable in a direction transversely with respect to the reference position of the cable or transversely, in particular perpendicularly, with respect to a cable ducting means of the cable suspension arrangement, with a relative change in position of the cable suspension point with respect to the center of the luminaire fixing region. A setting means of that kind can be in the form of a setting screw which is provided on the cable suspension arrangement or a luminaire housing region which is displaceable relative to the cable suspension arrangement. The displacement means can also be for example in the form of a slider member which is displaceable by a setting screw transversely with respect to the longitudinal direction in which the cable extends. For that purpose the slider member can be mounted on a suitable carriage or a carriage-like region of the housing. The suspension member arranged on the cable for the luminaire housing, like a clamp at the end, can also serve as the slider member. The setting means or the slider in that case can be movable linearly transversely with respect to the longitudinal direction in which the cable extends. In that respect the actuating element for the slider can be actuable from a direction transversely with respect to the longitudinal direction in which the cable extends, possibly the slider can be actuable also from a vertical direction, for example from the top side of the luminaire, with the interposition of a force direction-changing means.

The invention further concerns a luminaire housing with a cable suspension arrangement according to the invention. In that case the luminaire housing may surround the cable suspension arrangement in two vertically spaced planes, for which purpose the housing has a fixing region for the cable suspension arrangement, which region in the position of installation is arranged in a first vertical height, wherein it is possible to provide above same a cover through which the lateral displacement means can be actuated, for example by the insertion of a tool into a recess in the cover, in which respect this includes the displacement means terminating approximately at the height of the cover. For greater ease of actuation the displacement means can also project upwardly or laterally from the housing.

In particular the cable suspension means can be fixed to a device carrier of the luminaire, wherein the device carrier accommodates further electrical devices or connections of the luminaire for operation of the respective light means, such as for example electrical connections, transformers or the like. The invention however is not restricted to such a configuration of the light suspension arrangement on the luminaire housing.

A particularly stable construction is afforded if the fixing region of the housing is in the form of a U-shaped region which for example can also represent a partial region of another profile. The configuration in the form of a U-profile however affords a comparatively low weight with a high level of stiffness of the housing region. In this case the U-profile is provided with at least one receiving means for a cable suspension arrangement. The U-profile is held to the inside wall of a box profile or is integrally connected thereto, wherein the box profile has a top, preferably removable cover. The U-profile can however possibly also be composed of a plurality of profiles, for example by means of two L-shaped profiles. In that case the box profile preferably forms a peripherally substantially closed profile. The box profile can be of a substantially rectangular or square cross-section without being restricted thereto. In this case the U-profile preferably lies flat against the inside walls of the box profile and therefore preferably substantially matches the cross-sectional shape of the box profile without that always being absolutely necessary. That affords a simple way of fixing the cable suspension arrangement while involving a high level of stiffness for the luminaire housing region or the device carrier. The U-profile can extend substantially over the longitudinal extent of the respective part of the housing, such as for example a device carrier, the U-profile can optionally also be associated with only one respective cable suspension.

The respective luminaire housing according to the invention can be suspended by two, three or four cable suspension arrangements without being restricted thereto.

BRIEF DESCRIPTION OF THE DRAWINGS

The invention is described hereinafter by way of example and illustrated by way of example with reference to the Figures in which.

DETAILED DESCRIPTION

Figure 1:
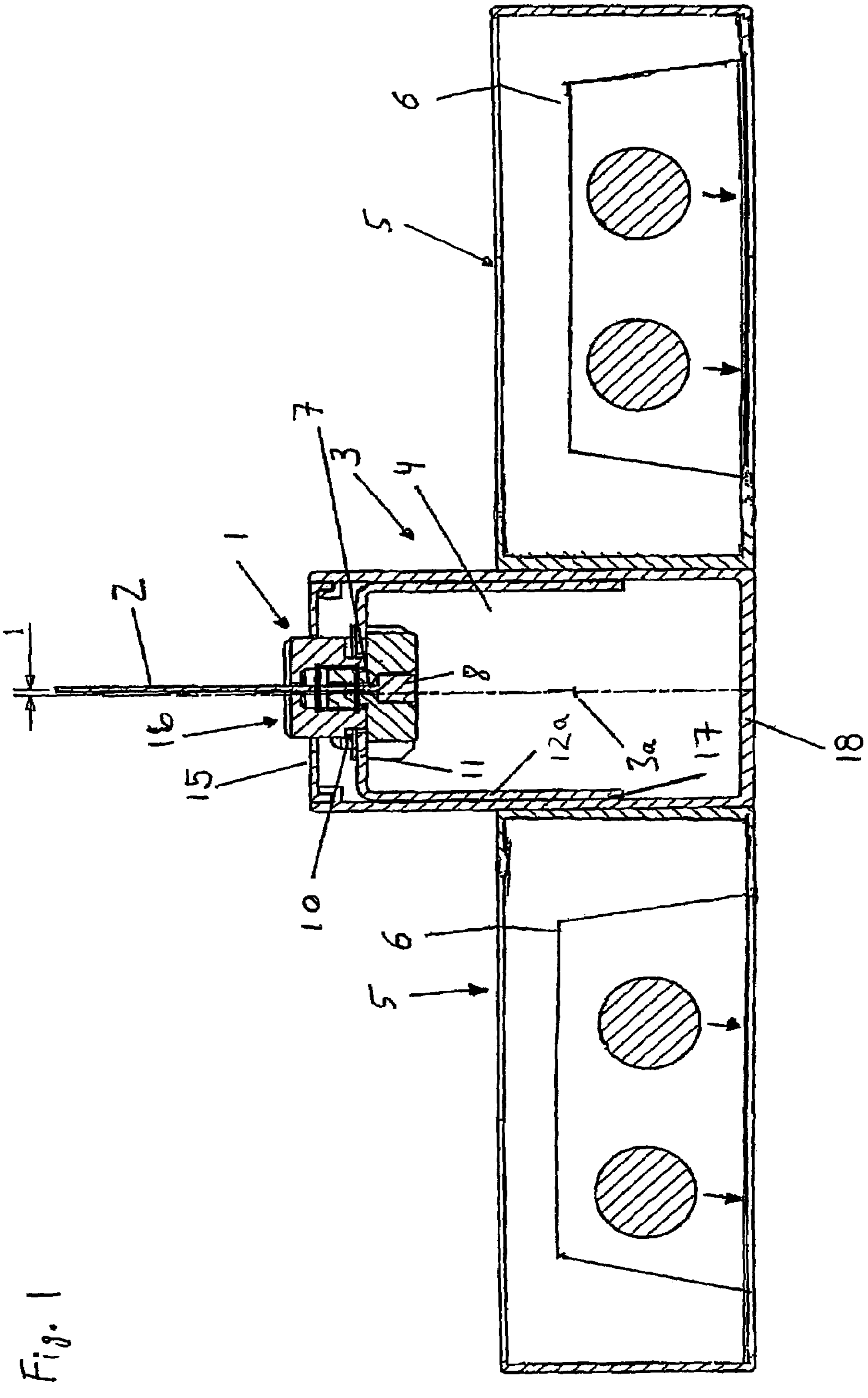
FIG. 1 is a cross-sectional view of a hanging luminaire with a cable suspension arrangement according to the invention.

FIG. 1 shows a cable suspension arrangement 1 according to the invention in a preferred embodiment with a suspension cable 2 which can be fixed to a ceiling or the like, wherein suspended from the cable suspension arrangement is a luminaire housing 3 which has a central device carrier 4 and arranged on both sides thereof bodies 5 for accommodating light means such as for example fluorescent tubes or the like with associated reflectors 6. The center of gravity of the luminaire is diagrammatically indicated at 3*a*.

The cable suspension arrangement 1 defines a cable holder point 7 which is defined by the cable center point in the region of the cable fixing. In this case cable fixing is effected in such a way that provided at the end of the cable that is towards the luminaire is a cross-sectional enlargement in the form of clamp 8 fitted thereon, the clamp being accommodated completely by the recess 9 of the cable suspension arrangement, although it can optionally also project partially or completely from the cable suspension arrangement in a vertical direction.

In this case the longitudinal direction of the luminaire is defined by the connecting line joining the two cable suspension means or the fixing regions associated therewith, which are mostly arranged at the end regions of the luminaire housing. It will be appreciated that the width of the wing-like bodies 5 may optionally exceed the length of the luminaire or that the luminaire may involve other irregular luminaire geometries.

Figure 4:
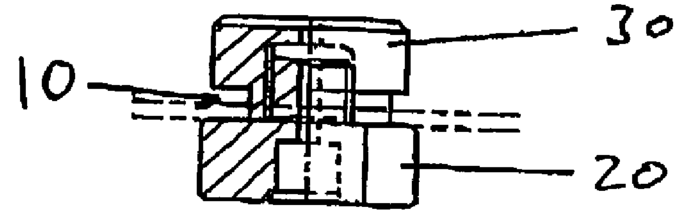
FIG. 4 shows a partly broken-away side view of a cable suspension arrangement according to the invention.

For the purposes of fixing the luminaire to the cable suspension arrangement the latter has a lateral cross-sectional constriction which here is in the form of a laterally open peripheral groove 10 (FIG. 4). By virtue of the rotation, described hereinafter, of the cable suspension arrangement for compensating for inclined positions of the hanging luminaire, it will be appreciated that the cross-sectional constriction should extend at least over the peripheral region defined by the rotary movement. In this case, substantially horizontally arranged fixing regions 11 of the luminaire engage into the peripheral groove 10, the fixing regions 11 extending here horizontally and being fixed in load-transmitting relationship to the luminaire. The fixing regions 11 in this case are a component part of a U-profiled carrier profile 12, but it is also possible optionally to provide oppositely disposed L-shaped profiles, in which case the carrier profile 12 having the fixing regions 11 at the same time provides means for preventing displacement of the cable suspension arrangement in the longitudinal direction of the luminaire. For that purpose, provided in the carrier profile are suitable through openings for receiving the cable suspension arrangement, which openings can be closed over their full periphery.

The center 14 of the fixing region of the cable suspension arrangement, the boundary of which is shown in broken line in FIG. 3 for clearly indicating same is defined in this case by the center of the cable suspension arrangement region having a cross-sectional constriction or peripheral groove 10 or, in the given embodiment, it is defined by the center of the eccentric, wherein in accordance with the illustrated embodiment the fixing region 11 of the luminaire surrounds the fixing region 12 of the cable suspension arrangement with only a small amount of play or practically no play.

Figure 3A:
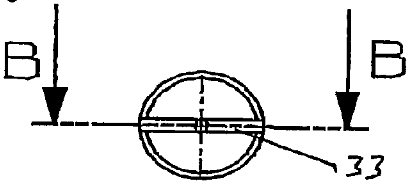
FIG. 3 shows views from below and above (FIG. 3*a* and FIG. 3*b*), sectional views (FIG. 3*c* and FIG. 3*d*) of an upper cable suspension member of the cable suspension arrangement according to the invention.
Figure 3E:
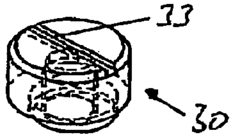
Figure 3C:
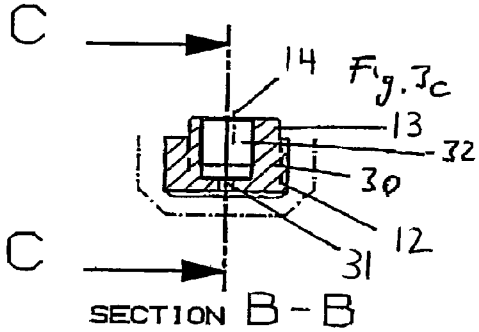
Figure 3D:
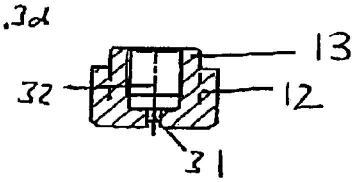
Figure 3B:
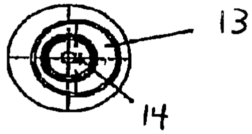

In order to compensate for irregular weight distributions of the luminaire, which would result in inclined positioning of the hanging luminaire which is only suspended at two suspension points, there are provided means for displacement of the center of gravity of the luminaire relative to the cable holder point of the respective suspension arrangement, in the form of an eccentric element 13. For that purpose the fixing region 12 of the cable suspension arrangement is of an eccentric nature (see also FIGS. 3*a* and 3*b*). By rotation of the cable suspension arrangement around the longitudinal direction in which the cable extends in its reference position or about the longitudinal axis of the cable it is possible (see in particular FIG. 3*a*) for the center of the fixing region of the cable suspension arrangement or coupled thereto the fixing region of the luminaire and therewith the luminaire overall to be displaced laterally with respect to the cable suspension arrangement or the cable holder point 7. The extent of such displacement depends on the eccentricity and/or the diameter of the eccentric element 13. The eccentricity is indicated in FIG. 3*b* by specifying the centers of the cable suspension means and the center 14 of the fixing region, it will be appreciated that the lateral displacement of the luminaire in relation to the cable suspension means is at a maximum and a minimum respectively in two positions which are rotated through 90° relative to each other, in which respect slight displacement of the cable holder point and the center of the fixing region of the cable suspension arrangement in the longitudinal direction of the luminaire is practically unnoticeable. In that respect the lateral displacement can be in the range of between 1 and 3 mm. By virtue of the fact that the luminaire generally is displaced laterally with respect to its suspension point and thus carries the weight of the luminaire overall, comparatively slight lateral displacements of the luminaire are sufficient to orient it horizontally.

Figure 5:
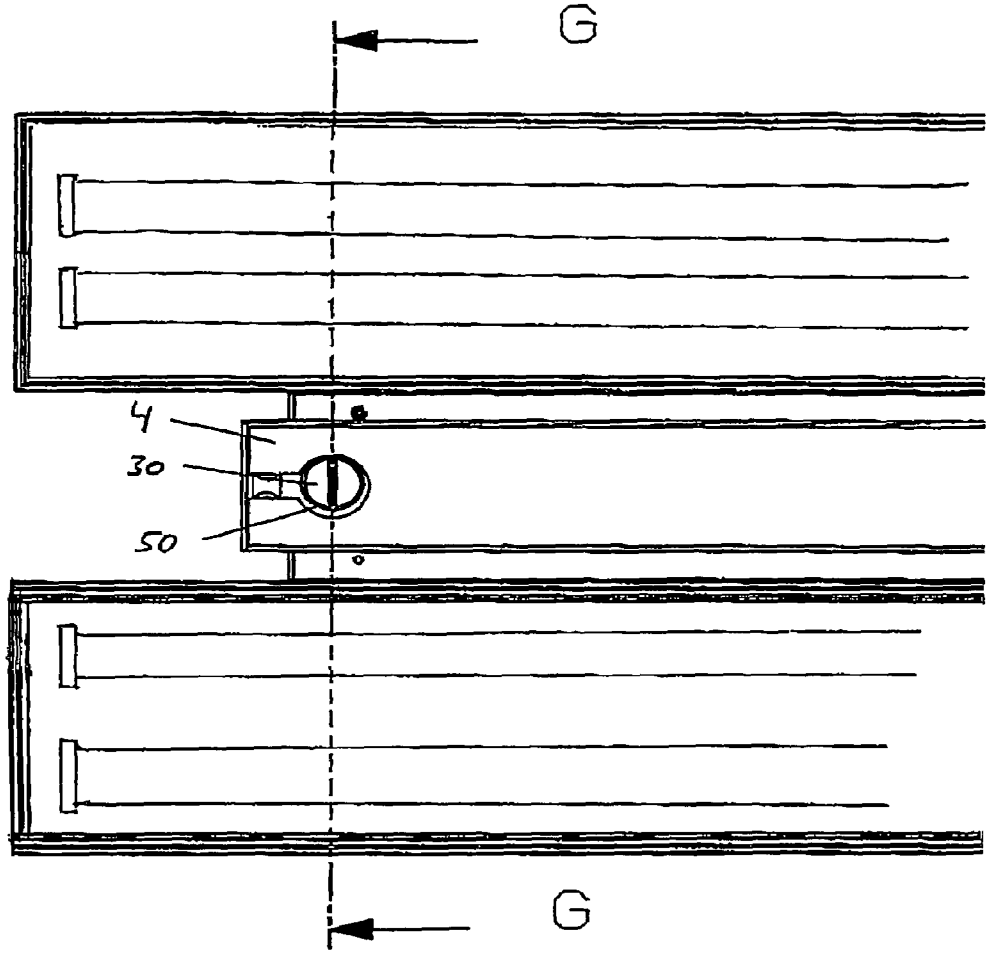
FIG. 5 shows a plan view of a hanging luminaire with a cable suspension arrangement according to the invention.

In accordance with the illustrated embodiment the device carrier is provided with a cover 15 through which the cable suspension arrangement projects in a vertical direction. By virtue of the lateral displacement of the luminaire with respect to the cable suspension point the through opening 16 of the cover is of a somewhat diameter than the through opening provided in the fixing region 11 in order to be able to compensate for the eccentric movement of the cable suspension arrangement relative to the luminaire, having regard to the diameter of the cable suspension means (see FIG. 5).

In this respect, the luminaire shown in FIG. 1 represents a dual-wing luminaire, the wings each being formed by a respective one of the bodies 5 arranged at the two sides of the device carrier. In this case the carrier profile 12 is also fixed, for example welded, to the walls 17 of the box profile 18, in such a way as to carry the load involved, thereby achieving a high level for stiffness for the device carrier.

In order to be able to fix the cable suspension arrangement securely to the luminaire housing, the cable suspension arrangement has a lower suspension member 20 (see FIG. 2) and an upper suspension member 30 (see FIG. 3). The lower suspension member has a holding region 21 which in the illustrated embodiment is of a substantially cylindrical configuration and onto which can be laid the leg-shaped fixing region 11 of the luminaire, in load-carrying relationship. The lower suspension member is also provided with a contact region for load-transmitting suspension from the cable 2, the recess 9 being provided for that purpose. The recess 9 opens in a cable passage or ducting means 22 which can be connected to a cable passage or ducting means 31, forming a continuous cable passage or ducting means, preferably with the two cable passages or ducting means 22, 31 in coaxial relationship. In addition the lower suspension member has a fixing means for securing to the upper suspension member, for which purpose mutually corresponding screwthreaded pins 23 and a screwthreaded recess 32 are provided on the upper and lower suspension members. In addition, a securing means, for example in the form of a screw securing means, as is known, for example by a squeeze element, adhesive means or the like, can be provided on the screw-threaded region in order to be able to move the upper and lower suspension members always in coupled relationship. A tool engagement region 24 in the form of mutually opposite flats for the engagement of an open-ended wrench or the like is possibly provided on the lower suspension member in order to be able to fix the suspension members to each other, preferably non-rotatably.

Figure 2A:
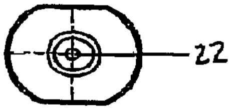
FIG. 2 shows views from below and above (FIG. 1*a* and FIG. 2*b*), a side view (FIG. 2*c*), a sectional view (FIG. 2*d*) and a perspective view (FIG. 2*e*) of a lower suspension member of the cable suspension arrangement according to the invention.
Figure 2E:
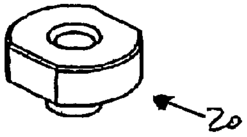
Figure 2C:
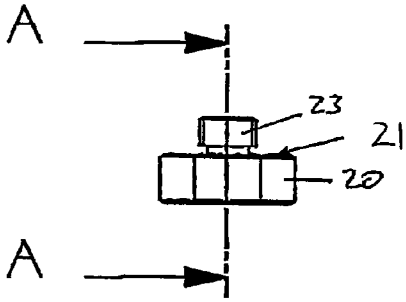
Figure 2D:
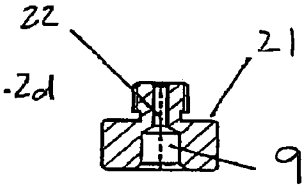
Figure 2B:
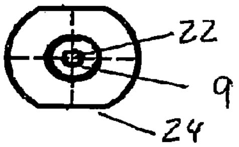
Figure 6:
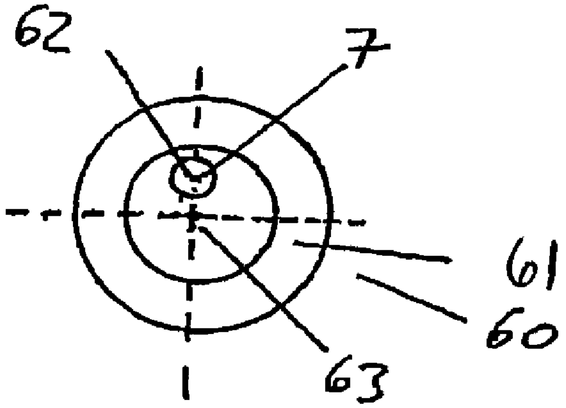
FIG. 6 shows a diagrammatic plan view of a cable suspension arrangement according to the invention in a further embodiment.

The upper suspension member has a tool engagement means 33 in the form of a slot which at the same time serves as a marking for the position of the respective lateral displacement means or the eccentric 13. As shown in FIG. 3*a* the upper suspension member has a central fixing region in the form of a screwthreaded receiving means 32 which is disposed coaxially with respect to the cable passage 31 or a cable holding region of a different configuration, the eccentric 13 being laterally displaced by between about 1 and 3 mm. It will be appreciated that, by virtue of rotation of the cable suspension through 90°, the eccentric 13 is also rotated and that thereby causes lateral displacement of the luminaire housing relative to the cable holder point in a direction transversely with respect to the longitudinal direction of the housing. This is diagrammatically illustrated in FIG. 5, in which respect the eccentric position of the upper cable suspension arrangement can be read off at the luminaire housing or the device carrier thereof by reference to the slot 50, wherein the longitudinal extent of the slot is parallel to the line of eccentricity, that is to say the connecting line joining the center point of the eccentric element to the cable holder point (se FIGS. 3*a* and 3*c*). FIG. 6 shows a diagrammatic plan view of an alternative suspension arrangement which is designed substantially like that shown in FIGS. 1–4. A modification lies in the eccentric arrangement in which the fixing region 61 of the cable suspension arrangement for the luminaire or therewith also the fixing region of the luminaire are arranged in centered relationship on the cable suspension arrangement, in which respect the cable holder region 62 which can be in the nature of the recess 9 shown in FIG. 2*d* is arranged eccentrically with respect to the longitudinal axis of the cable suspension arrangement or the axis of rotation 63 of the suspension arrangement. In this case also rotation of the cable suspension arrangement can implement lateral displacement of the luminaire relative to the suspension point in order to set the luminaire horizontally.

List of References

1 cable suspension arrangement
2 cable
3 luminaire housing
3*a* center of gravity of the luminaire housing
4 device carrier
5 body
6 reflector
7 cable holder point
8 clamp
9 recess
10 peripheral groove
11 fixing region
12 fixing region
12*a* carrier
13 eccentric element
14 center of the fixing region
15 cover
16 through opening
17 wall
18 box profile
20 lower suspension member
21 holding region
22 cable passage
23 screwthreaded pin
24 tool engagement region
30 upper suspension member
31 cable passage
32 screwthreaded recess
33 tool engagement region
50 slot
60 cable suspension arrangement
61 fixing region
62 cable holder region
63 axis of rotation
70 cable suspension arrangement

What is claimed is:

1. A cable suspension arrangement for hanging luminaires comprising a holder for a cable which is vertical in the position of installation for suspending a luminaire at a cable holder point and a fixing region for fixing the luminaire to the suspension arrangement, wherein the fixing region has a center, wherein there are provided lateral displacement means for displacement of the cable holder point laterally with respect to the longitudinal direction in which the cable extends, relative to the center of the fixing region for the luminaire, or for displacement of the center of gravity of the luminaire, laterally with respect to the longitudinal extent of an associated luminaire, relative to the cable holder point of the luminaire housing, characterized in that the lateral displacement means includes an eccentric element, the rotation of which causes lateral displacement of the cable holder point and the center of the light fixing region relative to each other or of the cable holder point and the center of gravity of an associated luminaire housing relative to each other.

2. A cable suspension arrangement as set forth in claim 1 characterized in that the cable holder has a cable passage means for the cable which extends through the center of the suspension arrangement and which is invariable in position upon actuation of the lateral displacement means.

3. A cable suspension arrangement as set forth in claim 1 characterized in that the cable suspension arrangement includes suspension members which in the position of installation are upper and lower members and which can be fixed to each other, and that at least the lower suspension member has a cable holder and a fixing region for a corresponding fixing region of the luminaire housing.

4. A cable suspension arrangement as set forth in claim 3 characterized in that arranged in the connecting region of the upper and lower suspension members is a lateral cross-sectional constriction for receiving the fixing region of the luminaire housing.

5. A cable suspension arrangement as set forth in claim 1 characterized in that the lateral displacement means is arranged at or engages an upper suspension member.

6. A cable suspension arrangement as set forth in claim 5 characterized in that the lateral displacement means is in the form of an eccentric element and is arranged at the upper suspension member.

7. A cable suspension arrangement as set forth in claim 1 characterized in that an actuating member for lateral displacement of the cable holder relative to the fixing region of the luminaire housing or for lateral displacement of the center of gravity of the associated luminaire relative to the cable holder is arranged at the end of the cable suspension arrangement, which is the upper end in the position of installation.

8. A cable suspension arrangement as set forth in claim 1 characterized in that there is provided an actuating member for the eccentric element, at which the position of the eccentric element can be read off at least indirectly or directly.

9. A luminaire housing of a hanging luminaire having a cable suspension arrangement with means for displacement of the center of gravity of the luminaire housing, laterally with respect to the longitudinal extent of the luminaire, relative to at least one or more cable holder points of the luminaire housing, characterized in that there is provided a cable suspension arrangement as set forth in claims 1.

10. A luminaire housing as set forth in claim 9 characterized in that the housing has a fixing region for the cable suspension arrangement, which in the position of installation is arranged in a first vertical height, and that provided above the fixing region is a cover through which the lateral displacement means can be actuated or through which same projects in the position of installation upwardly or laterally out of the housing.

11. A luminaire housing as set forth in claim 9 characterized in that the cable suspension arrangement is fixed to a device carrier of the luminaire housing.

12. A luminaire housing as set forth in claim 9 characterized in that the luminaire represents a dual-wing luminaire in which bodies for accommodating light means extend on both sides of the longitudinal axis defined by the cable suspension arrangements.

13. A luminaire housing as set forth in claim 9 characterized in that the fixing region of the housing is in the form of a carrier which is provided with at least one receiving means for a cable suspension arrangement, preferably with two receiving means spaced in the longitudinal direction of the housing, and which is held to the wall of a box profile, and that the box profile has a top cover.

* * * * *

UNITED STATES PATENT AND TRADEMARK OFFICE

CERTIFICATE OF CORRECTION

PATENT NO. : 7,019,210 B2
APPLICATION NO. : 10/847894
DATED : March 28, 2006
INVENTOR(S) : Radin et al.

It is certified that error appears in the above-identified patent and that said Letters Patent is hereby corrected as shown below:

Title page, item [54], column 1, lines 1-2,
Page 1, title: "CABLE SUSPENSION ARRANGEMENT FOR LUMINARIES" delete and insert --WIRE SUSPENSION FOR LUMINARIES--.

Signed and Sealed this

Eleventh Day of July, 2006

JON W. DUDAS
*Director of the United States Patent and Trademark Office*